United States Patent
Simon et al.

(10) Patent No.: US 11,333,897 B2
(45) Date of Patent: May 17, 2022

(54) APPARATUS FOR FORMING A HOMOGENEOUS INTENSITY DISTRIBUTION WITH BRIGHT OR DARK EDGES

(71) Applicant: Coherent LaserSystems GMBH & Co. KG, Göttingen (DE)

(72) Inventors: Frank Simon, Goettingen (DE); Ludwig Schwenger, Hannover (DE); Andrea Caprara, Palo Alto, CA (US)

(73) Assignee: Coherent LaserSystems GMBH & Co. KG, Göttingen (DE)

(*) Notice: Subject to any disclaimer, the term of this patent is extended or adjusted under 35 U.S.C. 154(b) by 30 days.

(21) Appl. No.: 16/799,370

(22) Filed: Feb. 24, 2020

(65) Prior Publication Data
US 2020/0292836 A1    Sep. 17, 2020

Related U.S. Application Data

(60) Provisional application No. 62/817,331, filed on Mar. 12, 2019.

(51) Int. Cl.
*G02B 27/09* (2006.01)
*G02B 3/00* (2006.01)

(52) U.S. Cl.
CPC ....... *G02B 27/0961* (2013.01); *G02B 3/0062* (2013.01)

(58) Field of Classification Search
CPC ............ G02B 27/0961; G02B 27/0966; G02B 27/0905; G02B 3/0062
See application file for complete search history.

(56) References Cited

U.S. PATENT DOCUMENTS

| 5,414,559 | A | * | 5/1995 | Burghardt | ............ | B23K 26/067 |
| | | | | | | 359/599 |
| 5,796,521 | A | * | 8/1998 | Kahlert | ................. | G02B 27/09 |
| | | | | | | 359/619 |
| 6,016,227 | A | | 1/2000 | Hopkins et al. | | |
| 7,085,062 | B2 | | 8/2006 | Hauschild | | |
| 7,265,908 | B2 | | 9/2007 | Anikitchev | | |

(Continued)

FOREIGN PATENT DOCUMENTS

| DE | 3829728 A1 | 3/1989 |
| DE | 10225674 A1 | 12/2003 |

(Continued)

OTHER PUBLICATIONS

International Search Report and written Opinion received for PCT Patent Application No. PCT/EP2020/056544, dated Sep. 25, 2020, 20 pages.

(Continued)

*Primary Examiner* — Alicia M Harrington
(74) *Attorney, Agent, or Firm* — Morrison & Foerster LLP

(57) ABSTRACT

A beam homogenizer for transforming a beam of laser-radiation into a flat-top intensity distribution having brighter or darker edges comprises a first lens array, a second lens array, and a positive lens. The first lens array includes a plurality of lens elements that are separated by gaps having no optical power. Brighter or darker edges are produced by selecting a distance between the first and second lens arrays that is less than or greater than the focal length of lens elements in the second lens array.

19 Claims, 12 Drawing Sheets

(56) References Cited

U.S. PATENT DOCUMENTS

| | | |
|---|---|---|
| 7,400,457 B1 | 7/2008 | Cayer |
| 2008/0002261 A1 | 1/2008 | Hill et al. |
| 2008/0014685 A1 | 1/2008 | Govorkov et al. |
| 2009/0032511 A1* | 2/2009 | Adams ............... B23K 26/0732 219/121.75 |
| 2011/0228537 A1 | 9/2011 | Yoshimizu et al. |
| 2012/0057345 A1 | 3/2012 | Kuchibhotla |
| 2018/0335615 A1* | 11/2018 | Tsur .................... G02B 21/361 |

FOREIGN PATENT DOCUMENTS

| | | | |
|---|---|---|---|
| EP | 1489438 A1 | 12/2004 | |
| EP | 1708008 A1 | 10/2006 | |
| EP | 2399158 A1 * | 12/2011 | ......... G02B 19/0014 |
| WO | 2006/072263 A1 | 7/2006 | |
| WO | 2016/139086 A1 | 9/2016 | |
| WO | 2018/052298 A1 | 3/2018 | |

OTHER PUBLICATIONS

Dumas et al., "From Modeling to Hardware: An Experimental Evaluation of Image Plane and Fourier Plane Coded Compressive Optical Imaging", Optics Express, vol. 25, No. 23, Nov. 13, 2017, pp. 29472-29491.

* cited by examiner

APPARATUS FOR FORMING A HOMOGENEOUS INTENSITY DISTRIBUTION WITH BRIGHT OR DARK EDGES

PRIORITY

This application claims priority to U.S. Provisional application Ser. No. 62/817,331, filed Mar. 12, 2019, the disclosure of which is incorporated herein in its entirety.

TECHNICAL FIELD OF THE INVENTION

The present invention relates in general to shaping light from lasers. It relates in particular to shaping light from one or more lasers into a beam of radiation having a uniform cross section with brighter or darker edges.

DISCUSSION OF BACKGROUND ART

Lasers have become essential sources for uniform illumination in a wide range of applications, including surface inspection of semi-conductor materials, thermal annealing of display-screen glass, metal hardening, and rapid assay of bio-medical fluids. A common requirement is an elongated beam of laser-radiation that uniformly illuminates a line on a flat surface or a plane in a volume of transparent material. Such elongated beams of laser-radiation are referred to generally as "line-beams."

Diode-lasers are efficient devices for converting electrical power into coherent optical power. For high-power applications, a diode-laser bar having a plurality of diode-laser emitters provide a convenient way to scale the optical power available from a single diode-laser emitter. The diode-laser emitters are spaced apart and arranged in a linear array thereof. Although diode-laser bars inherently have an elongated emission cross-section, it is necessary to overcome the non-uniform intensity distribution due to emission from a plurality of spatially-distributed diode-laser emitters.

An optical device for transforming a laser beam to make it uniform in intensity across a cross-section of the transformed beam is generally referred to as a "beam homogenizer". Beam homogenizers often include one or two "micro-lens arrays", comprising a plurality of tiny lenses, each much smaller than the incident beam. Each micro-lens becomes an illumination source contributing to the transformed beam. "Pitch" of a beam homogenizer is the distance between centers of adjacent micro-lenses. Additional optics are required to collect and shape the plurality of beams emerging from all the micro-lenses intercepting the incident beam. A linear array of micro-lenses may be used as a beam homogenizer for an elongated beam of laser-radiation emitted by a diode-laser bar. One example of such a beam homogenizer is described in U.S. Pat. No. 7,265,908.

Diode-pumped solid-state lasers, including fiber lasers, typically produce a Gaussian intensity distribution. A Gaussian laser beam can be transformed into an approximately uniform intensity distribution by a Powell lens or equivalent optic, then homogenized using lens arrays. Collimated laser beams from a plurality of such diode-pumped solid-state lasers can be combined and homogenized using lens arrays.

Slab lasers include diode-pumped solid-state lasers, gas discharge $CO_2$ lasers, and excimer lasers. Slab lasers inherently produce a line beam. However, the line beam may not be uniform in cross-section and the cross-sectional intensity distribution may be unstable. Lens arrays are used to homogenize line beams from slab lasers and to combine line beams from a plurality of slab lasers.

In processes that involve heating a portion of workpiece by laser illumination, a perfectly-uniform cross-sectional intensity distribution may not produce uniform laser processing, due to thermal transport away from the illuminated portion. Illumination by a laser beam having higher intensity at the edges of the intensity distribution would be preferable to ensure uniform heating. In other processes that require multiple passes of a line-beam to illuminate a large area on a workpiece, slightly-overlapping adjacent passes ensures complete exposure, but may cause differences in the processing of once and twice illuminated portions. Illumination by a laser beam having lower intensity at the edges of the intensity distribution would be preferable to prevent overexposure.

There is need for a beam-shaping apparatus to form a laser beam having an otherwise uniform cross-sectional intensity distribution with brighter or darker edges. Preferably, the optical apparatus would have the elegance, simplicity, and compactness of a lens-array homogenizer.

SUMMARY OF THE INVENTION

In one aspect, a beam homogenizer in accordance with the present invention comprises a first lens array having a plurality of identical lens elements. Each lens element of the first lens array has a focal length $F_1$. Neighboring lens elements of the first lens array are separated by a gap and each gap has a common width. A second lens array is provided. Each lens element of the second lens array has a focal length $F_2$. The first lens array and the second lens array are separated by a distance that is not equal to $F_2$. A positive lens is provided and located on an optical axis. The positive lens has a focal length $F_3$. The first lens array, the second lens array, and the positive lens are arranged in that order along the optical axis.

In another aspect, a beam homogenizer in accordance with the present invention comprises a first lens array having a plurality of identical lens elements. Each lens element of the first lens array has a flat center portion and curved outer portions. The center portion has no optical power and the outer portions have a focal length $F_1$. A second lens array is provided. Each lens element of the second lens array has a focal length $F_2$. The first lens array and the second lens array are separated by a distance that is not equal to $F_2$. A positive lens is provided, which is located on an optical axis and has a focal length $F_3$. The first lens array, the second lens array, and the positive lens are arranged in that order along the optical axis.

In yet another aspect, laser radiation propagates through the lens elements and the gaps of the first lens array, through the second lens array, through the positive lens, and onto an illumination plane in that order. The illumination plane is located a distance $F_3$ from the positive lens. The laser radiation propagating through the lens elements of the first lens array has a different magnification in the illumination plane than the laser radiation propagating through the gaps of the first lens array.

In still another aspect, laser radiation propagates through the first lens array, through the second lens array, through the positive lens, and onto an illumination plane in that order. The illumination plane is located a distance $F_3$ from the positive lens. The laser radiation on the illumination plane is transformed into a homogenized intensity distribution having brighter or darker edges in an otherwise uniform intensity distribution.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1A:
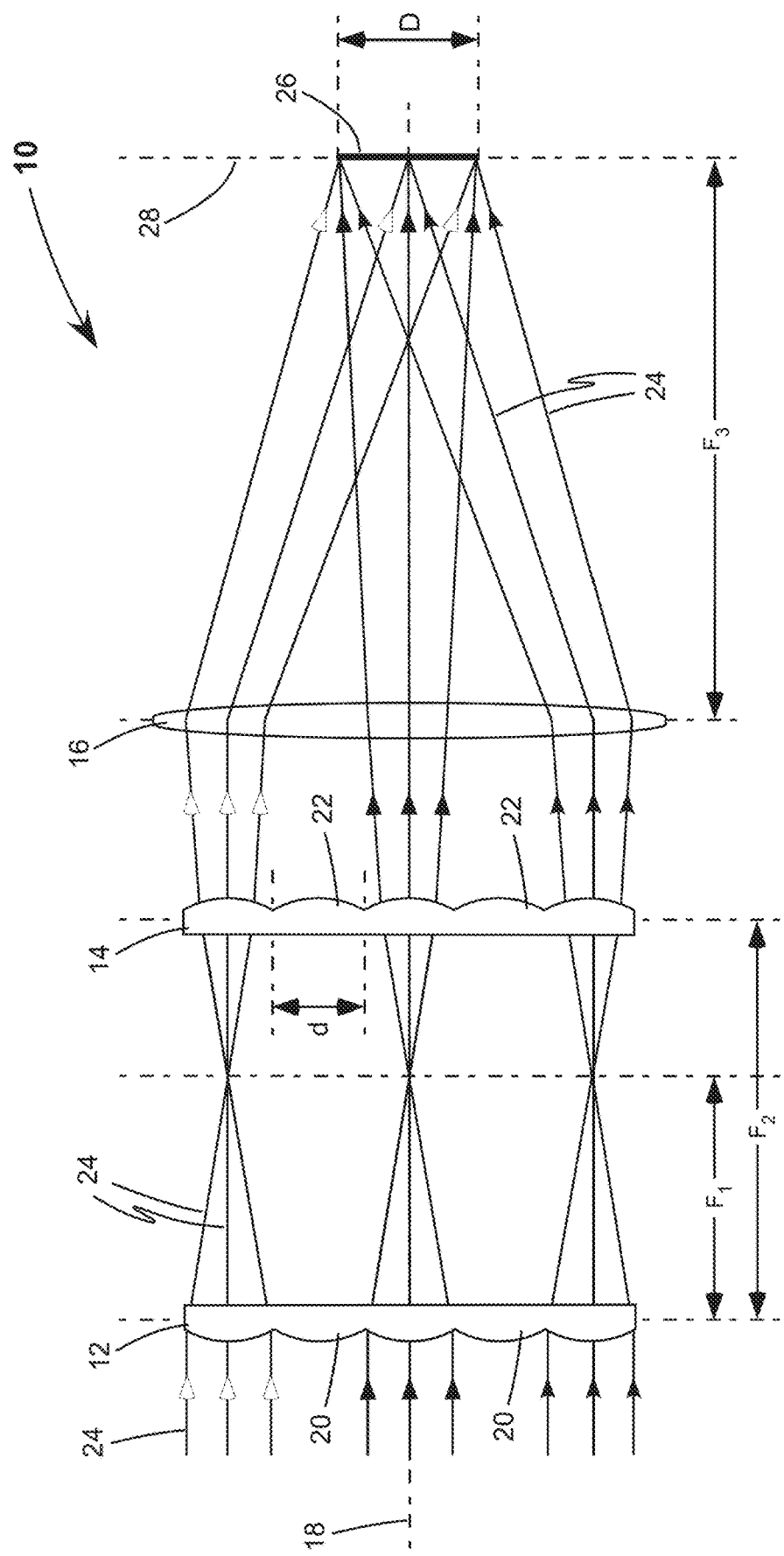
FIG. 1A is a plan view schematically illustrating a prior-art beam homogenizer, having a first lens array, a second lens array, and a positive lens. Collimated laser-radiation, propagating parallel to an optical axis, is incident on the first lens array and propagates through the beam homogenizer.

Referring now to the drawings, wherein like components are designated by like numerals, FIG. 1A schematically illustrates a prior-art beam homogenizer 10 having a first linear lens array 12, a second linear lens array 14, a positive lens 16, and an optical axis 18. Each identical lens element 20 of lens array 12 has focal length $F_1$, each identical lens element 22 of lens array 14 has focal length $F_2$, and lens 16 has focal length of $F_3$. Each lens element 20 and 22 has a common width d. Lens arrays 12 and 14 are separated by the distance $F_2$. The drawing depicts rays 24 of laser-radiation propagating through beam homogenizer 10. In this example, the laser-radiation incident on lens array 12 is collimated and propagating parallel to optical axis 18.

Figure 1B:
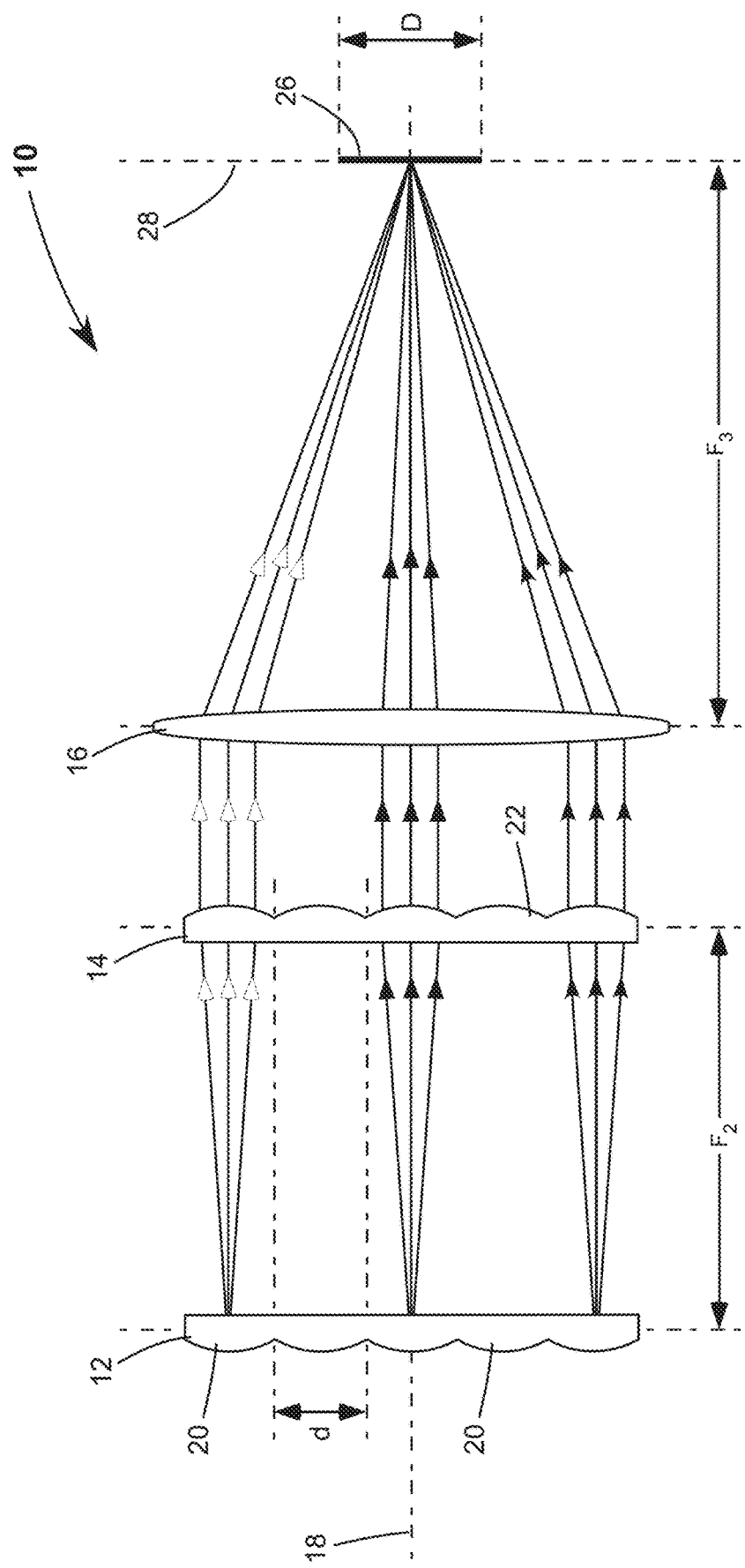
FIGS. 1B and 1C are plan views schematically illustrating imaging through the beam homogenizer of FIG. 1A. Inverted magnified images of each lens element in the first lens array are formed and overlap in an illumination plane.
Figure 1C:
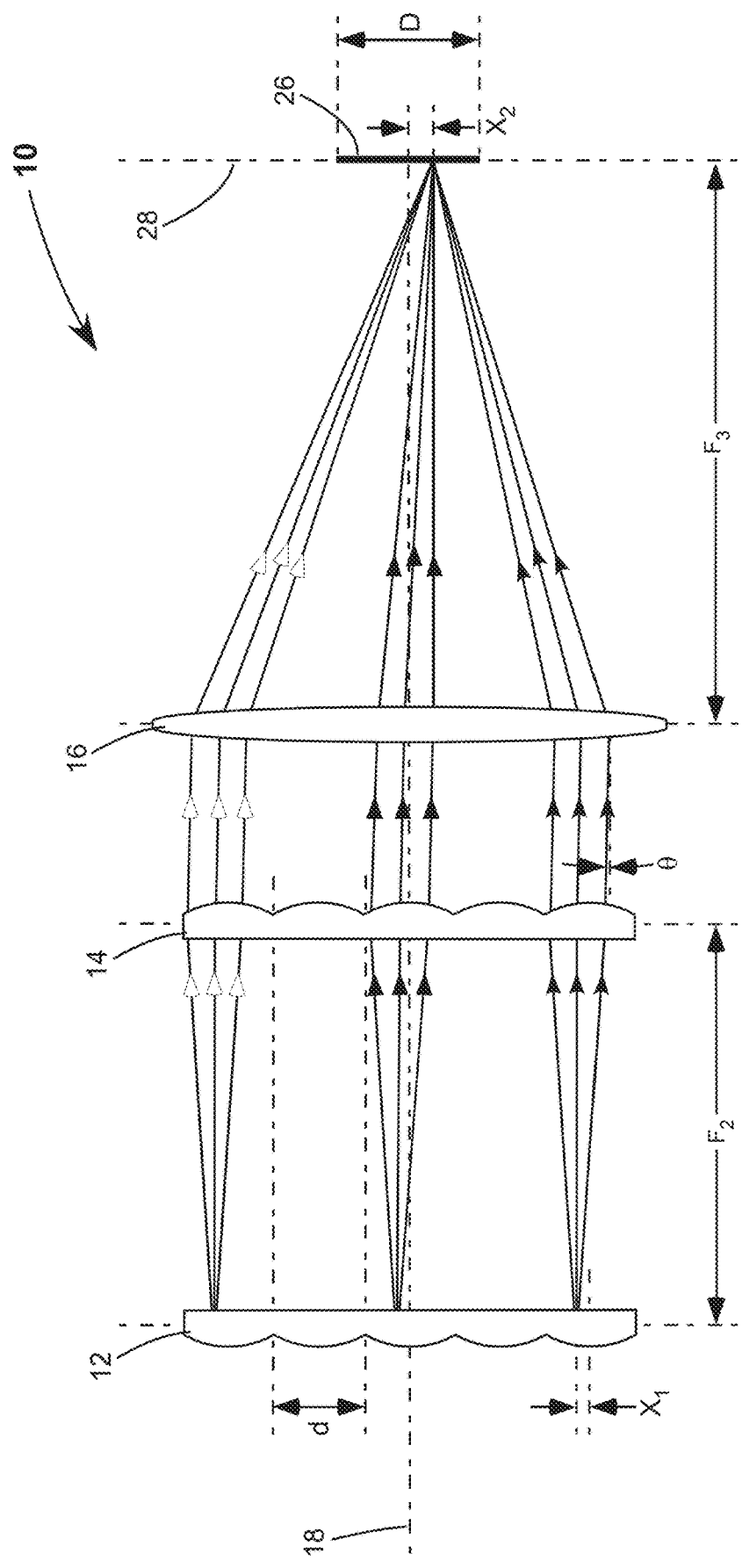

FIGS. 1B and 1C schematically illustrate imaging through beam homogenizer 10. An inverted magnified image 26 of the laser-radiation incident on each lens element 20 is formed in an illumination plane 28, which is located a distance $F_3$ from lens 16. The inverted magnified images 26 of all illuminated lens elements 20 are overlaid in illumination plane 28 and have width D. FIG. 1B depicts the imaging of rays originating from the center of each lens element 20. FIG. 1C depicts the imaging of rays originating from a location displaced by a distance $X_1$ from the center of each lens element 20. These rays are projected to a location in illumination plane 28 that is displaced by a distance $X_2$ from optical axis 18. The imaging magnification is the ratio $$\frac{-D}{d} = \frac{-X_2}{X_1} = \frac{-F_3}{F_2}.$$

Lens array 12 does not directly affect the homogenization and focal length $F_1$ does not determine the magnification. The purpose of lens array 12 is to increase the angle-of-acceptance for rays 24 incident on beam homogenizer 10. Although incident rays 24 are depicted parallel to optical axis 18, they can be incident up to a maximum angle with respect to the optical axis, while still projecting to an overlapped image in illumination plan 28. At the maximum angle-of-acceptance, peripheral rays focused by each lens element 20 would be incident onto an edge of the corresponding lens element 22. There is a compromise between this maximum angle-of-acceptance and the area of each lens element 22 that is illuminated. Reducing $F_1$ relative to $F_2$ increases this area, thereby reducing the vulnerability of lens elements 22 to optical damage, while also reducing the maximum angle-of-acceptance.

Figure 2A:
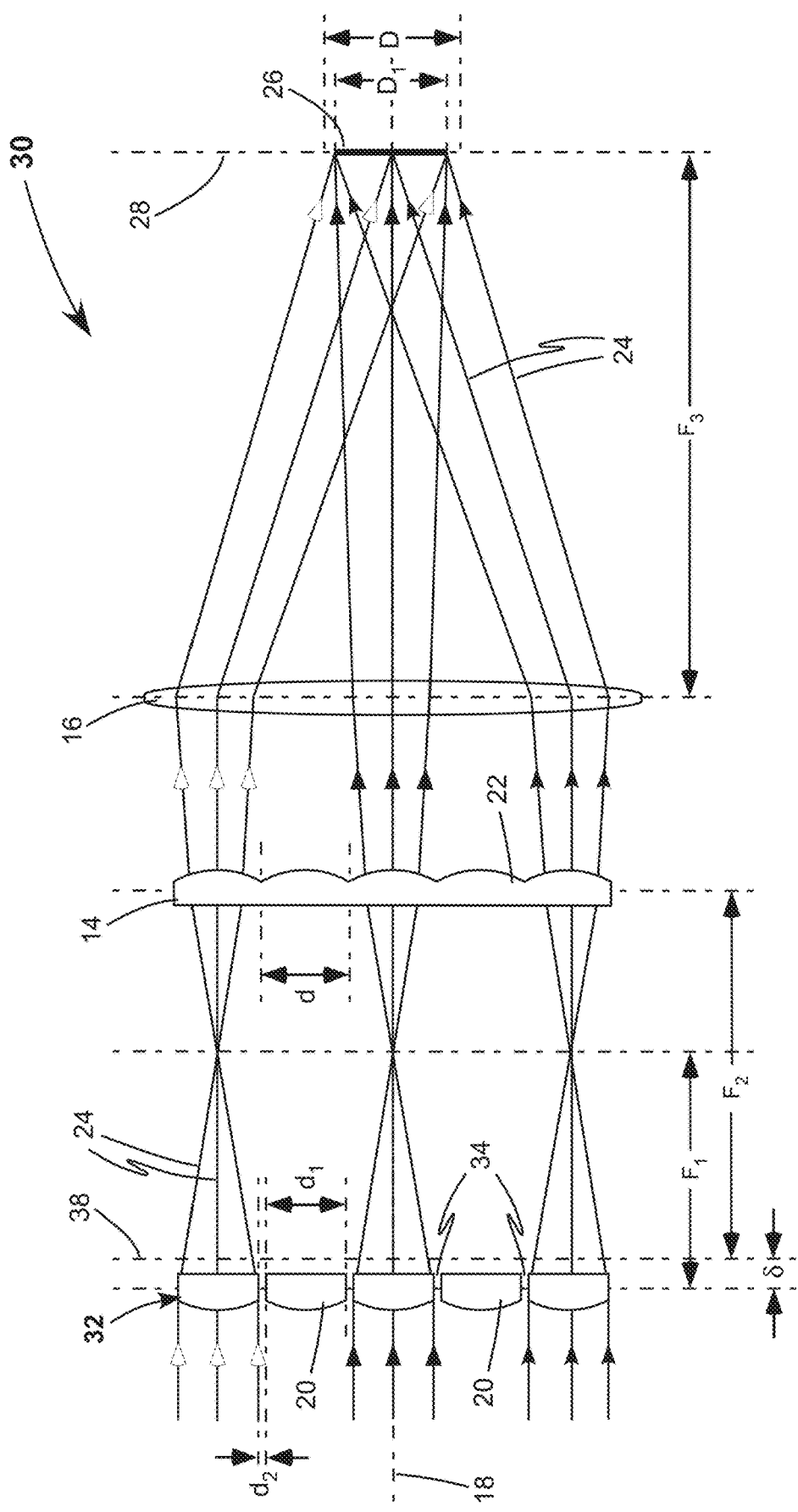
FIGS. 2A-2C are plan views schematically illustrating one preferred embodiment of beam homogenizer in accordance with the present invention. The inventive beam homogenizer comprises a first lens array, a second lens array, and a positive lens. Each lens element of the first lens array is separated by a gap that has no optical power. The distance between the first lens array and the second lens array is slightly greater than the focal length of each lens element of the second lens array.
Figure 2B:
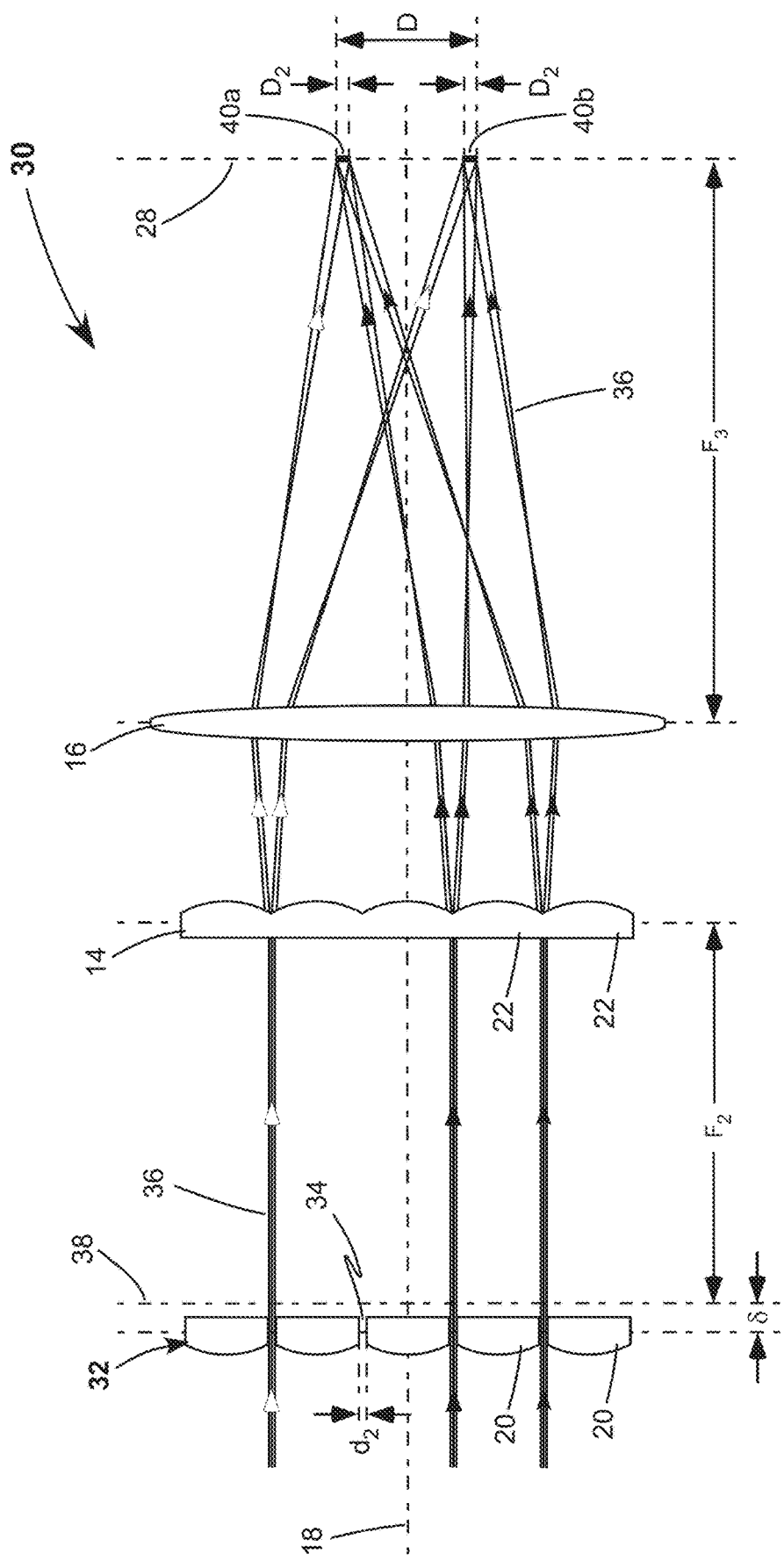
Figure 2C:
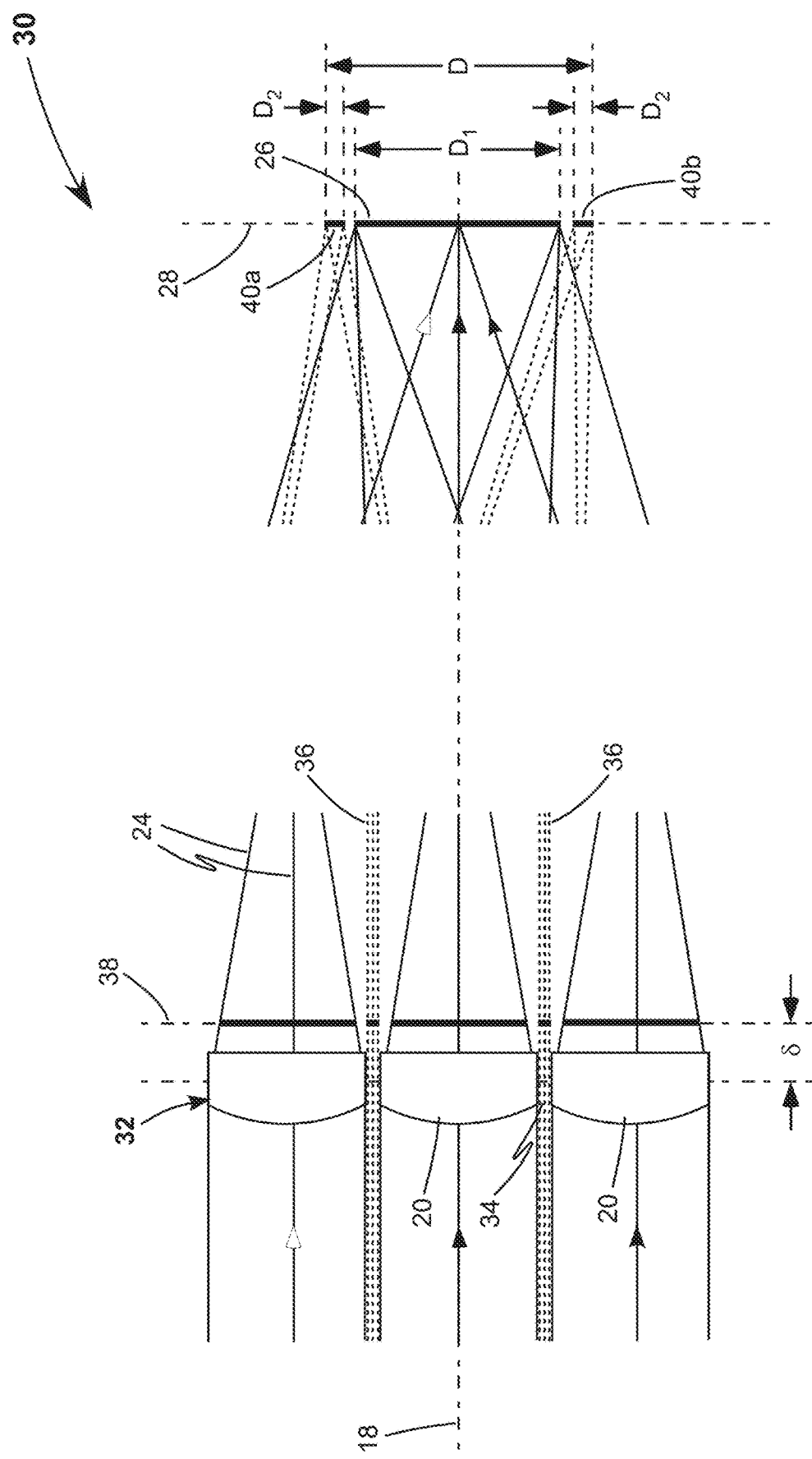

FIGS. 2A-2C schematically illustrate one preferred embodiment of beam homogenizer 30 in accordance with the present invention. Beam homogenizer 30 is similar to beam homogenizer 10, with exceptions that neighboring lens elements 20 of a first lens array 32 are separated by identical gaps 34 and that the separation between first lens array 32 and second lens array 14 is a distance $F_2\delta$. Each lens element 20 has a common width $d_1$, each gap 34 has a common width $d_2$, and each lens element 22 has a common width $d=d_1+d_2$. The distance $\delta$ is small compared to focal length $F_2$. For example, $\delta$ is preferably less than 20% of $F_2$. $\delta$ is more-preferably less than 10% of $F_2$ and most-preferably less than 5% of $F_2$.

Gap 34 is depicted as an empty gap or "air gap". Gap 34 could also be made of a transparent glass or polymer. Gap 34 is most-preferably made of the same material as lens elements 20, having plane parallel surfaces and therefore no optical power. In general, it would be practical to grind or mold lens array 32 from a single piece of the material, with each gap fixedly connecting neighboring lens elements. FIG. 2A depicts rays 24 of laser-radiation that propagate through lens elements 20. FIG. 2B depicts rays 36 of laser-radiation that propagate through gaps 34. FIG. 2C has enlarged views of both rays 24 (solid) and rays 36 (dashed), around illumination plane 28 and around lens array 32

To describe the imaging through inventive beam homogenizer 30, it is useful to consider a ray-transfer matrix analysis or ABCD matrix analysis, as known in the optics art. Referring first to FIG. 1C, the ray-transfer matrices for focusing by lens 16 and propagation between lens 16 and illumination plane 28 are:

$$\begin{bmatrix} 1 & F_3 \\ 0 & 1 \end{bmatrix} \begin{bmatrix} 1 & 0 \\ -\frac{1}{F_3} & 1 \end{bmatrix} = \begin{bmatrix} 0 & F_3 \\ -\frac{1}{F_3} & 1 \end{bmatrix}. \quad (1)$$

The displacement $X_2$ of a ray from optical axis 18 in illumination plane 28 therefore depends only on its angle of incidence $\theta$ on lens 16:

$$X_2 = F_3 \theta. \quad (2)$$

Returning to FIGS. 2A and 2B, the ray-transfer matrices for focusing by each lens element 20, propagation between lens array 32 and lens array 14, and focusing by corresponding lens element 22 are:

$$\begin{bmatrix} 1 & 0 \\ -\frac{1}{F_2} & 1 \end{bmatrix} \begin{bmatrix} 1 & F_2+\delta \\ 0 & 1 \end{bmatrix} \begin{bmatrix} 1 & 0 \\ -\frac{1}{F_1} & 1 \end{bmatrix} = \begin{bmatrix} 1-\frac{F_2+\delta}{F_1} & F_2+\delta \\ -\frac{1}{F_2}\left(1-\frac{\delta}{F_1}\right) & -\frac{\delta}{F_2} \end{bmatrix} \quad (3)$$

In the example depicted of collimated laser-radiation incident on lens array 32, the angle of incidence $\theta$ of a ray on lens 16 therefore depends on the displacement $X_1$ of the ray from the center of lens element 20 and on distance $\delta$:

$$\theta = \frac{-X_1}{F_2}\left(1 - \frac{\delta}{F_1}\right). \quad (4)$$

The displacement $X_2$ of a ray from optical axis 18 in illumination plane 28 is therefore:

$$X_2 = \frac{-X_1 F_3}{F_2}\left(1 - \frac{\delta}{F_1}\right). \quad (5)$$

When $\delta=0$, which corresponds to the "ideal imaging" of beam homogenizer 10, Equation 5 becomes simply:

$$X_2 = \frac{-X_1 F_3}{F_2}. \quad (6)$$

It should be noted that in this ideal imaging condition, the overall magnification of the beam homogenizer does not depend on focal length $F_1$. However, when $\delta \neq 0$, the magnification factor changes due to the term $$\frac{-\delta}{F_1}$$

in Equation 5. For inventive beam homogenizer 30 having $\delta > 0$, the magnification factor is different for rays 24 incident on a lens element 20 having a focal length $F_1$ and rays 36 incident on a gap 34 having a focal length that is essentially infinite. For rays incident on a gap, the term $$\frac{-\delta}{F_1}$$

is zero and the absolute magnification becomes $$\frac{F_3}{F_2},$$

which is the same absolute magnification as for ideal imaging. For rays incident on a lens element, the absolute magnification is $$\frac{F_3}{F_2}\left(1 - \frac{\delta}{F_1}\right),$$

which is smaller. It should be noted that just having an air gap or optically inert gap is insufficient. The condition $\delta \neq 0$ is necessary for rays incident on a gap and rays incident on a lens element to have different magnifications.

Referring to FIG. 2A, inverted images 26 of all illuminated lens elements 20 are overlaid in illumination plane 28. Image 26 is magnified by $$\frac{-F_3}{F_2}\left(1 - \frac{\delta}{F_1}\right)$$

and therefore has a width $$D_1 = \frac{d_1 F_3}{F_2}\left(1 - \frac{\delta}{F_1}\right).$$

Referring now to FIG. 2B, inverted images 40a and 40b of all illuminated gaps 34 are also overlaid in illumination plane 28. The two gap images are divided according to the lens element 22 of lens array 14 the respective rays are incident on. Gap images 40a and 40b are both magnified by $$\frac{-F_3}{F_2}.$$

Therefore, each gap image has a width $$D_2 = \frac{d_2 F_3}{2 F_2}.$$

Referring now to FIG. 2C, the smaller absolute magnification of image 26 produces dark gaps between image 26 and gap images 40a and 40b.

It is insightful to consider beam homogenizer 30 in terms of the ideal imaging described above. Within beam homogenizer 30, an image plane 38 located distance $F_2$ from lens array 14 is accurately imaged onto illumination plane 28 by lens array 14 and lens 16. Image plane 38 is illuminated by converging rays 24 focused by lens elements 20 and parallel rays 36 propagating through gaps 34. The illumination of image plane 38 is a repeated pattern of broader and narrower bands, which is depicted in FIG. 2C. The illumination of image plane 38 is projected to and overlaid on illumination plane 28 by lens array 14 and lens 16, with a magnification of $$\frac{-F_3}{F_2}.$$

The two descriptions presented of beam homogenizer 30, one using ray-transfer matrices and the other in terms of ideal imaging, are equivalent. The homogenizer produces a uniform or "flat top" intensity distribution in an illumination plane that has reduced intensity towards the edges of the otherwise uniform intensity distribution. The relative locations and width of the dark gaps within the intensity distribution are controlled by selecting focal length $F_1$, gap width $d_2$, and distance $\delta$.

Figure 3A:
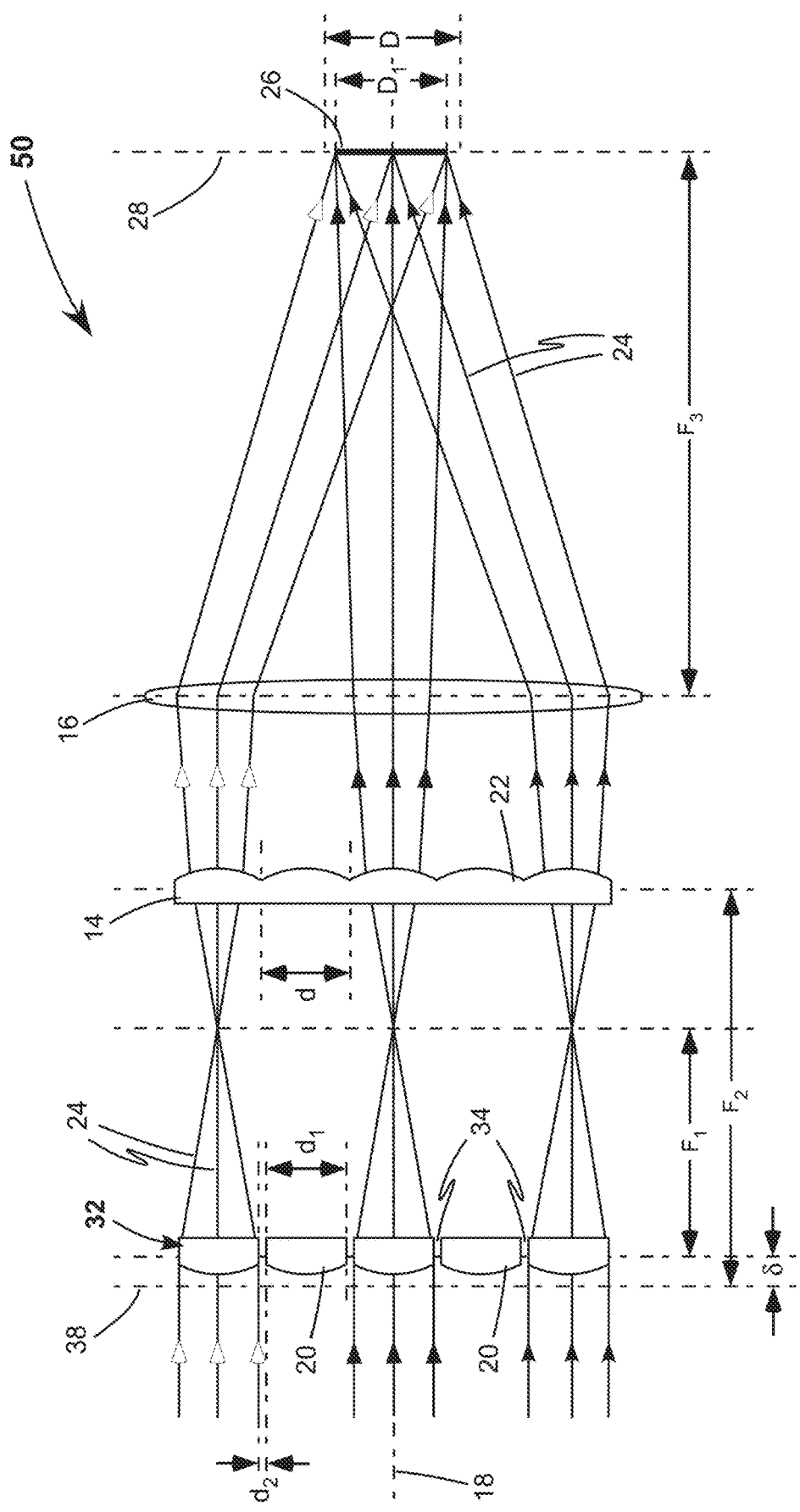
FIGS. 3A and 3B are plan views schematically illustrating another preferred embodiment of beam homogenizer in accordance with the present invention, similar to the embodiment of FIGS. 2A-2C, but the distance between the first lens array and the second lens array is slightly less than the focal length of each lens element of the second lens array.
Figure 3B:
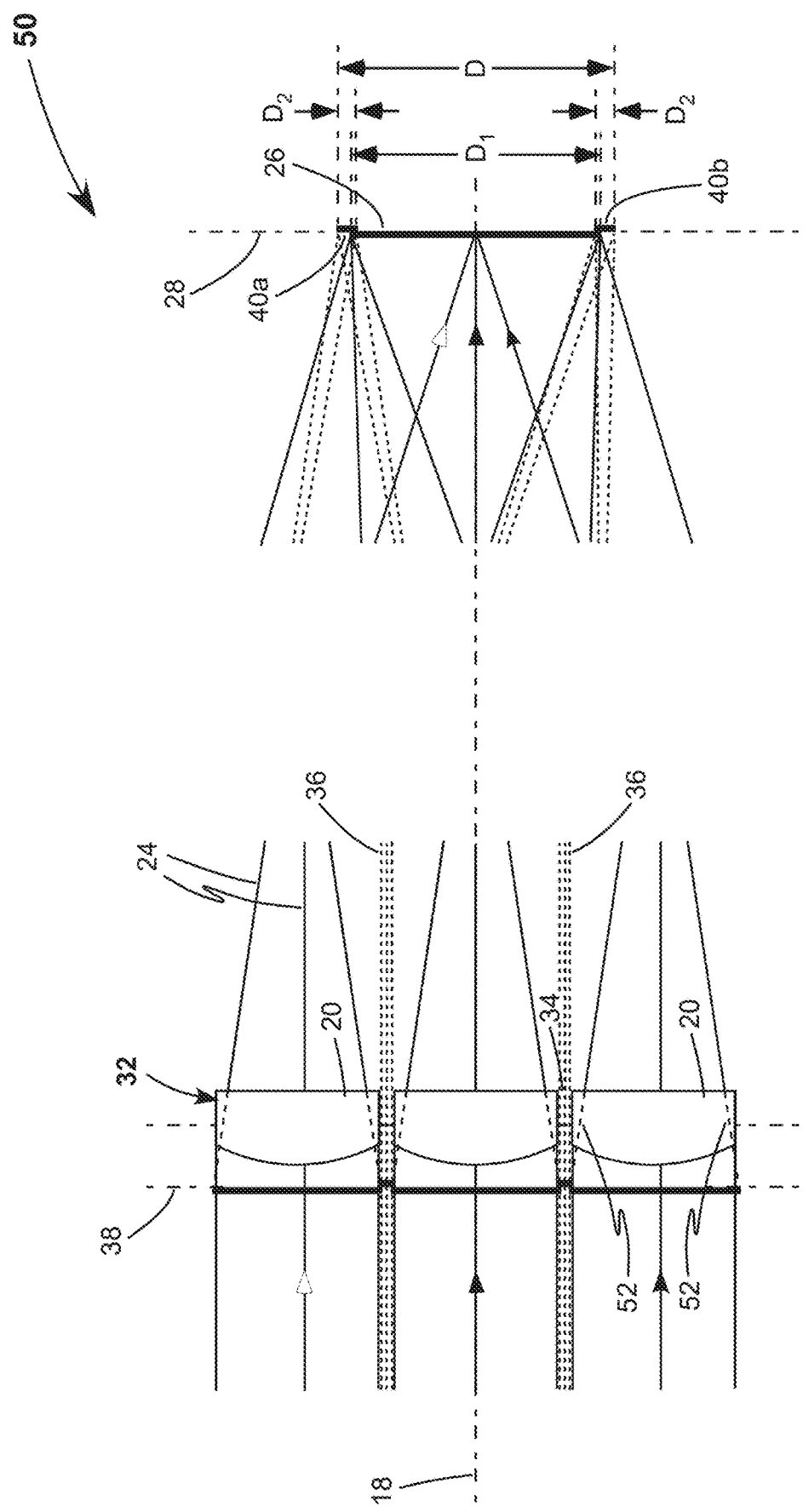

FIGS. 3A and 3B schematically illustrate another preferred embodiment of beam homogenizer 50 in accordance with the present invention. Beam homogenizer 50 is similar to beam homogenizer 30, with an exception that the separation between lens arrays 32 and 14 is a smaller distance $F_2-\delta$. The ray-transfer matrix analysis for beam homogenizer 50 is the same as for beam homogenizer 30. Image 26 is magnified by $$\frac{-F_3}{F_2}\left(1+\frac{\delta}{F_1}\right)$$

and has a width $$D_1 = \frac{d_1 F_3}{F_2}\left(1+\frac{\delta}{F_1}\right),$$

while width $$D_2 = \frac{d_2 F_3}{2F_2}.$$

Therefore, for rays 24 incident on a lens element 20, the absolute magnification is larger than for rays 36 incident on a gap 34. This larger magnification produces an overlap between image 26 and gap images 40a and 40b. The overlap produces two bright peaks towards the edges of the otherwise uniform intensity distribution. The imaging onto illumination plane 28 is depicted in FIG. 3B, with illumination by rays propagating through lens elements 20 and gaps 34 distinguished by respective left and right offsets, for convenience of illustration.

In terms of ideal imaging, image plane 38 is located in the path of rays 24 incident on lens elements 20 and rays 36 incident on gaps 34, prior to lens array 32. Again, for convenience of illustration, illumination of image plane 38 by rays 24 and rays 36 is distinguished by respective left and right offsets. Although image plane 38 is uniformly illuminated, portions of the plane illuminated by rays 36 (right offset) are imaged through both lens elements 20 and gaps 34. For example, dashed rays 52 depicted on lens elements 20 originate from portions of the image plane that are illuminated by rays 36. Portions imaged through both the lens elements and the gaps will appear brighter when projected onto illumination plane 28. Beam homogenizer 50 thereby produces a uniform intensity distribution in the illumination plane that has increased intensity towards the edges.

Figure 4A:
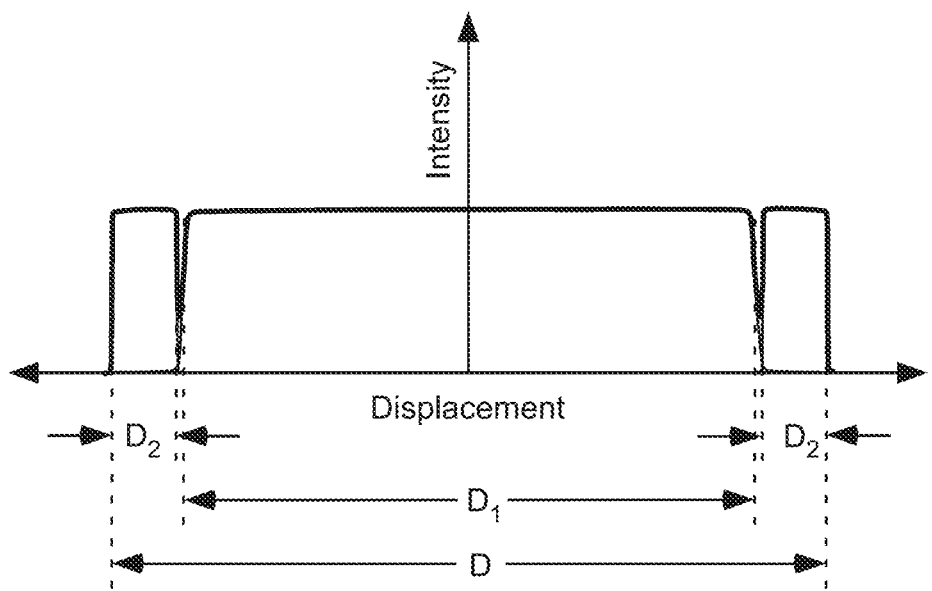
FIG. 4A schematically illustrates an intensity distribution in an illumination plane for a beam of laser-radiation propagating through the beam homogenizer of FIGS. 2A-2C.
Figure 4B:
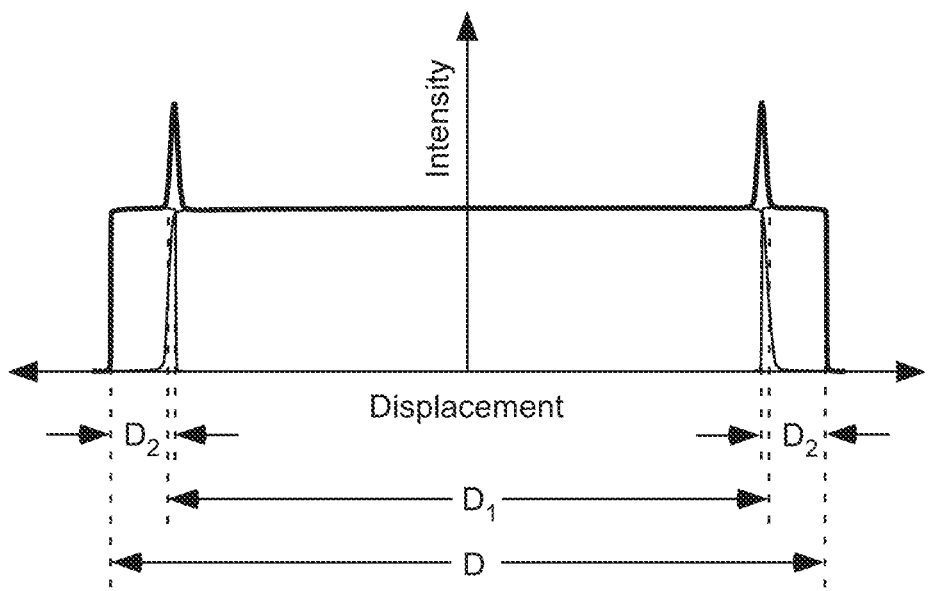
FIG. 4B schematically illustrates an intensity distribution in an illumination plane for a beam of laser-radiation propagating through the beam homogenizer of FIGS. 3A and 3B.

FIG. 4A schematically illustrates the nominally uniform intensity distribution in illumination plane 28 having dark gaps towards the edges of the intensity distribution produced by beam homogenizer 30. The overall intensity distribution is depicted as a heavy line and underlying intensity distributions produced by rays propagating through lens elements 20 and gaps 34 are depicted as lighter-weight lines. Similarly, FIG. 4B schematically illustrates the nominally uniform intensity distribution in illumination plane 28 having bright peaks towards the edges of the intensity distribution produced by beam homogenizer 50. It should be noted that the overall width D of the intensity distribution is independent of gap width $d_2$ and distance $\delta$. Dark gaps appear in the intensity distribution of FIG. 4A because $D>D_1+2D_2$. Bright peaks appear in the intensity distribution of FIG. 4B because $D<D_1+2D_2$.

A beam homogenizer having a lens array 32 configured and arranged to be longitudinally translated parallel to optical axis 18 could be adjusted to produce a continuum of intensity distributions: having darker edges (as in FIG. 4A) or brighter edges (as in FIG. 4B) or a completely uniform intensity. These intensity distributions would have an overall width D that is constant and an intensity over most of distance $D_2$ at the edges that is also constant. Mechanical devices for precise linear translation of an optic are commercially available and a detailed description of such devices is not necessary for understanding the principles of the present invention. An intensity distribution with darker edges would have a slightly higher intensity over distance $D_1$ between the dark gaps. An intensity distribution with brighter edges would have a slightly lower intensity over distance $D_1$ between the bright peaks. When lens array 32 has gaps 34 with widths $d_2$ of that are small compared to widths $d_1$ of lens elements 20, these intensity differences will be relatively small. By way of example, a ratio $$\frac{d_2}{d_1}$$

that is less than 0.12 or a ratio $$\frac{d_2}{d_1}$$

that is less than 0.06.

Figure 5A:
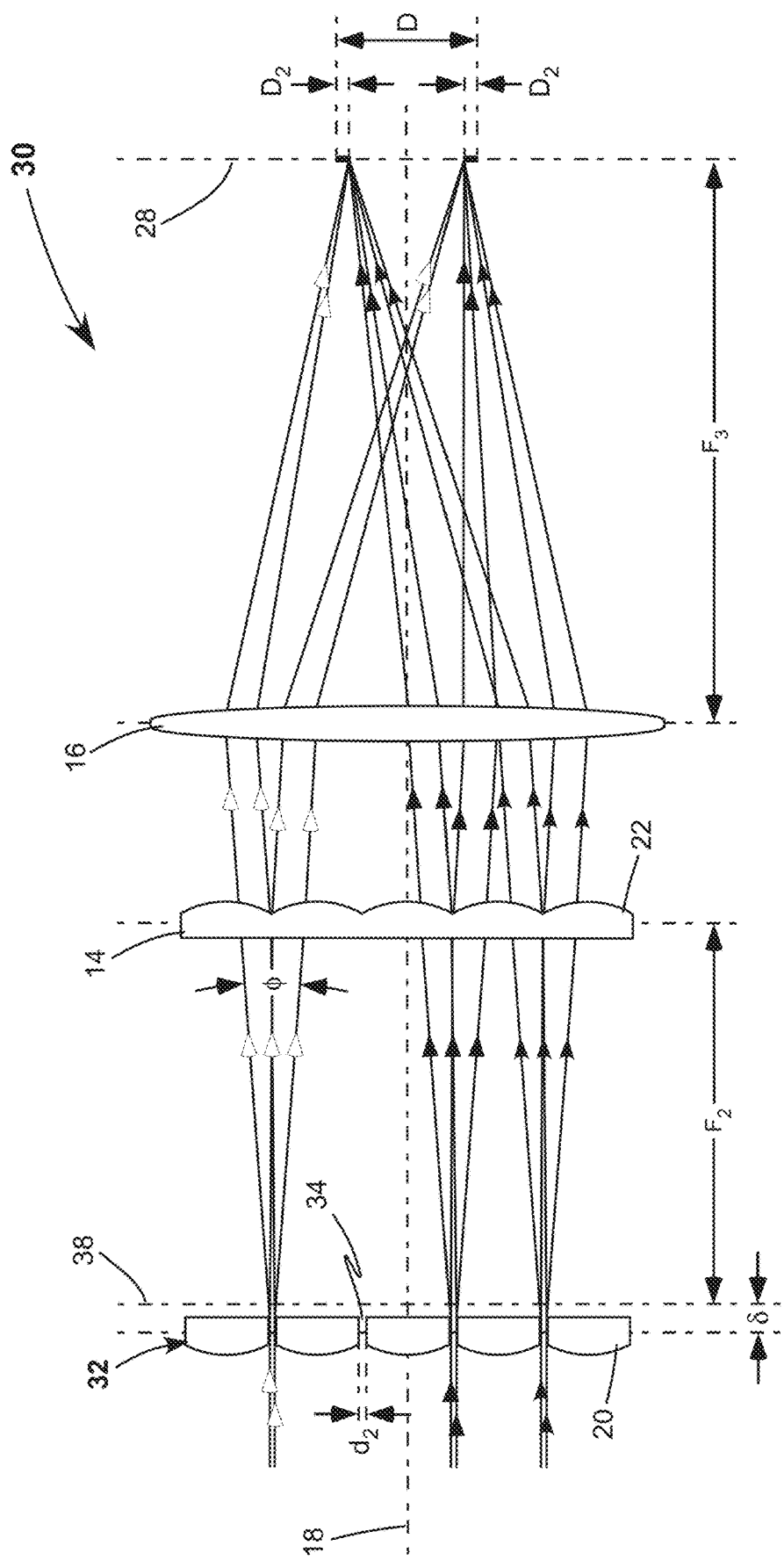
FIGS. 5A and 5B are plan views schematically illustrating effects of diffraction for beams of laser radiation propagating through the beam homogenizer of FIGS. 2A-2C.
Figure 5B:
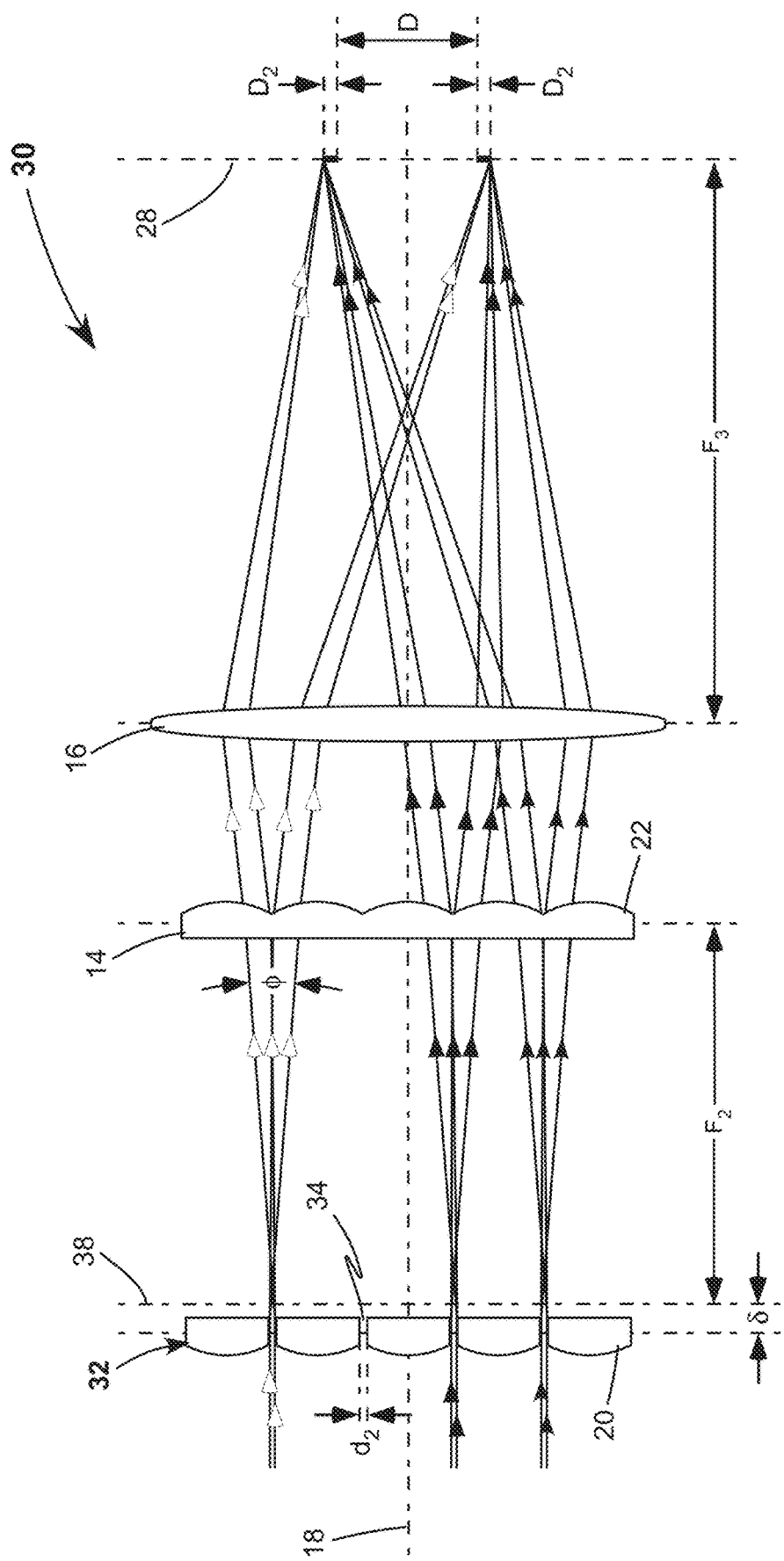

FIGS. 5A and 5B schematically illustrate some effects of diffraction, for beam homogenizer 30 of FIGS. 2A-2C. Diffraction would occur at the edges of each lens element 20 of lens array 32, which is the example depicted. Rays propagating through gaps 34 and close to a neighboring lens element 20 become angularly distributed. Rays passing very close to a lens element 20 become distributed over a full angle φ. It should be noted that an intensity distribution caused by diffraction at an edge is not uniform, but rather the diffracted intensity diminishes with increasing angle. Full angle φ is distinguished here to explain effects of this diffraction. It should also be noted that a diffracted ray may be directed towards one of two lens elements 22; either the lens element 22 that corresponds to the diffracting lens element 20 or another lens element 22 that is a neighbor of the corresponding lens element. Both of these lens elements 22 are located within the full angle ϕ.

FIG. 5A depicts only diffracted rays that propagate through the corresponding lens element 22 of lens array 14. These rays are projected onto the same range of locations in illumination plane 28 as in the absence of diffraction. FIG. 5B depicts only diffracted rays that propagate through the neighboring lens element 22. These rays are projected to a range of locations in illumination plane 28 that is outside the nominally uniform intensity distribution in the absence of diffraction. Overall, diffraction reduces slightly the illumination over a distance $D_2$ inside each edge of the nominally uniform intensity distribution and weakly illuminates a distance $D_2$ outside each edge of the intensity distribution. Edge contrast is therefore diminished by diffraction.

Figure 6A:
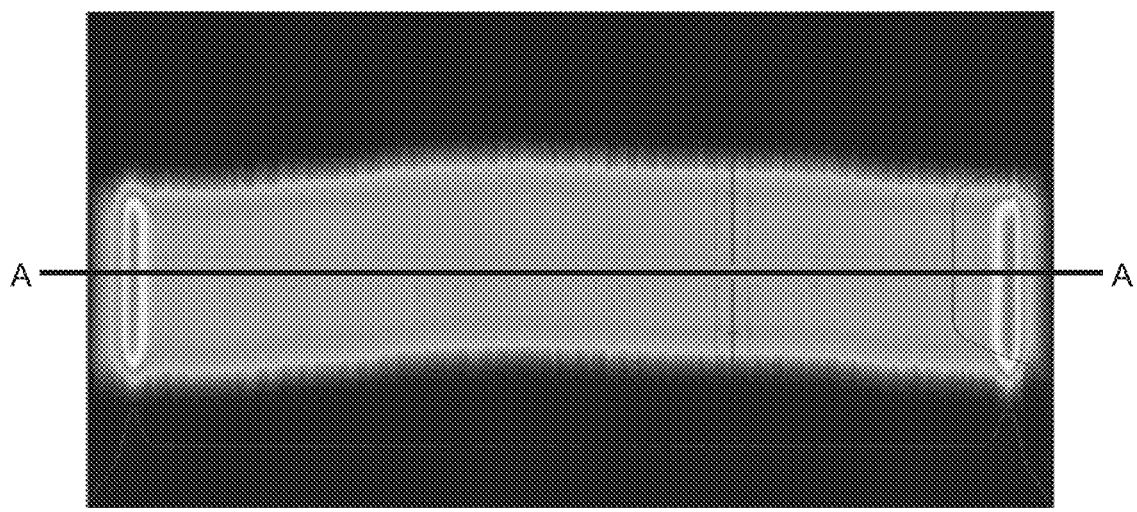
FIG. 6A schematically illustrates a camera image of an intensity distribution in an illumination plane for a beam of laser-radiation propagating through an example of the beam homogenizer of FIGS. 3A and 3B.
Figure 6B:
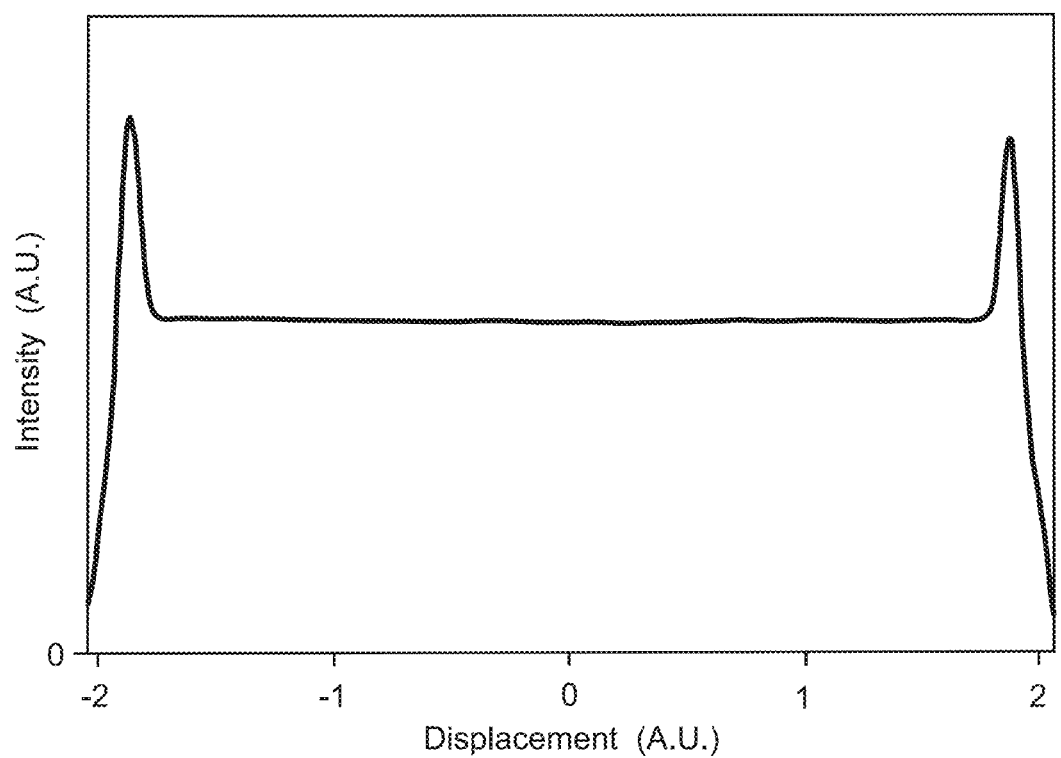
FIG. 6B is a graph schematically illustrating the intensity distribution along line A-A in FIG. 6A.

FIG. 6A schematically illustrates a camera image of an intensity distribution obtained using an experimental beam homogenizer 50. The image has been expanded in the vertical dimension relative to the horizontal dimension. The beam homogenizer was partially illuminated with a collimated beam from an excimer laser. Lens array 32 had twenty five lens elements 20 and most of these lens elements were illuminated. Lens array 32 had a ratio $$\frac{d_2}{d_1} = 0.026$$

and the width $d=d_1+d_2$ was several millimeters. FIG. 6B is a graph schematically illustrating the intensity distribution measured along line A-A overlaid on FIG. 6A. FIGS. 6A and 6B are shown on the same horizontal scale. The measured intensity distribution has bright peaks at each edge and relatively uniform intensity between the bright peaks. By longitudinally translating lens array 32, changing distance δ, the inventors demonstrated a continuous evolution from a completely uniform intensity distribution when δ was about 0 mm to the intensity distribution depicted having bright edges when δ was about 9 mm.

Although gaps in the first lens array having no optical power were shown and described herein, the requirement to produce an intensity distribution with dark gaps or bright peaks is "gaps" 34 in the first lens array having optical power substantially less than the optical power of lens elements 20 in first lens array 32. For example, gaps 34 could be occupied by weaker lens elements, the weaker lens elements having a focal length that is at least five times longer than the focal length $F_1$ of lens elements 20. Increasing the focal length of the weaker lens elements increases the contrast between the dark gaps or bright peaks and the uniform portions of the intensity distribution.

Gaps 34 in the first lens array having no optical power could have the form of slabs having plane parallel faces. Such a slab would not modify the angle of a ray that propagates therethrough. Alternatively, gaps 34 could have the form of wedges, which have plane but not parallel faces. A wedge angle would be another variable that can be selected to locate the dark gaps or bright peaks within the otherwise uniform intensity distribution, either towards the optical axis or away from the optical axis.

Yet another preferred embodiment of beam homogenizer apparatus to produce the intensity distributions depicted in FIGS. 4A and 4B would be similar to the beam homogenizers of FIGS. 3A and 2A, but having first lens array 32 replaced by a different inventive lens array. This different inventive lens array could be fabricated from prior art lens array 12 by machining flat a center portion of each lens element. The resulting lens array would have a plurality of identical lens elements, each lens element having a flat center portion and curved outer portions. The center portion would have no optical power and the outer portions would have a focal length $F_1$. Rays passing through flat portions would be imaged onto the illumination plane with a different magnification than rays passing through curved portions. An advantage of this embodiment of beam homogenizer is that the first lens array could be fabricated by simply grinding and polishing prior-art lens arrays, which are commercially available. For example, from Thorlabs of Newton, N.J. A disadvantage of this embodiment is that it has a smaller angle-of-acceptance for rays incident on the beam homogenizer.

The ray-transfer matrix analysis presented herein above assumes thin lenses and uses the paraxial approximation. The analysis using these assumptions is sufficient to describe the principles and operation of the present invention. One of skill in the art would recognize that precise calculations need to properly account for the shapes of optical elements and would recognize when to include these additional parameters.

In summary, a beam of laser-radiation can be transformed into a homogenized intensity distribution having brighter or darker edges in an otherwise uniform intensity distribution using the inventive beam homogenizer. The beam homogenizer includes a first lens array having a plurality of identical lens elements separated by gaps having a common width. A second lens array has a plurality of identical lens elements having a focal length $F_2$. The first and second lens arrays are separated by a distance that is close to, but not equal to, $F_2$. A separation distance less than $F_2$ produces bright peaks and a separation distance greater than $F_2$ produces dark gaps, which are located towards the edges of the intensity distribution.

The present invention is described above in terms of a preferred embodiment and other embodiments. The invention is not limited, however, to the embodiments described and depicted herein. Rather, the invention is limited only by the claims appended hereto.

What is claimed is:

1. A beam homogenizer, comprising:
 a first lens array, the first lens array having a plurality of identical lens elements, each lens element of the first lens array having a focal length $F_1$, neighboring lens elements of the first lens array being separated by a gap, the gap having no optical power, each gap having a common width;
 a second lens array, the second lens array having a plurality of identical lens elements, each lens element of the second lens array having a focal length $F_2$, the first lens array and the second lens array being separated by a distance $F_2 \pm \delta$, δ being a distance that is less than 20% of $F_2$; and
 a positive lens located on an optical axis having a focal length $F_3$, the first lens array, the second lens array, the positive lens, and an illumination plane being arranged in that order along the optical axis, the illumination plane located a distance $F_3$ from the positive lens;
 wherein $F_1$, $F_2$, $F_3$, and δ are selected such that a ray incident on a lens element of the first lens array at a distance $X_1$ from a center of the lens element is projected onto the illumination plane at a distance $X_2$ from the optical axis of $$\frac{-X_1 F_3}{F_2}\left(1 \mp \frac{\delta}{F_1}\right).$$

2. The beam homogenizer of claim 1, wherein the first lens array and the second lens array are separated by a distance $F_2+\delta$ that is more than $F_2$.

3. The beam homogenizer of claim 1, wherein the first lens array and the second lens array are separated by a distance $F_2-\delta$ that is less than $F_2$.

4. The beam homogenizer of claim 1, wherein $\delta$ is less than 10% of $F_2$.

5. The beam homogenizer of claim 4, wherein $\delta$ is less than 5% of $F_2$.

6. The beam homogenizer of claim 1, wherein the gap between neighboring lens elements of the first lens array is an empty gap or air gap.

7. The beam homogenizer of claim 1, wherein the gap between neighboring lens elements of the first lens array is made of the same material as the lens elements of the first lens array.

8. The beam homogenizer of claim 7, wherein the material that the gap and the lens elements of the first array are made from is a transparent glass or polymer.

9. The beam homogenizer of claim 1, wherein the gap between neighboring lens elements of the first lens array fixedly connects the neighboring lens elements.

10. The beam homogenizer of claim 1, wherein the gap between neighboring lens elements of the first lens array is in the form of a slab having plane parallel faces.

11. The beam homogenizer of claim 1, wherein the gap between neighboring lens elements of the first lens array is in the form of a wedge having plane but not parallel faces.

12. The beam homogenizer of claim 1, wherein an image having a repeated pattern of broader and narrower bands located in an image plane at a distance $F_2$ from the second lens array is imaged onto the illumination plane.

13. The beam homogenizer of claim 1, wherein the first lens array is configured and arranged to be longitudinally translated parallel to the optical axis.

14. A beam homogenizer, comprising:
a first lens array, the first lens array having a plurality of identical lens elements, each lens element of the first lens array having a flat center portion and curved outer portions, the center portion having no optical power and the outer portions having a focal length $F_1$;
a second lens array, the second lens array having a plurality of identical lens elements, each lens element of the second lens array having a focal length $F_2$, the first lens array and the second lens array being separated by a distance not equal to $F_2$; and
a positive lens located on an optical axis having a focal length $F_3$, the first lens array, the second lens array, and the positive lens being arranged in that order along the optical axis.

15. The beam homogenizer of claim 14, wherein the first lens array is configured and arranged to be longitudinally translated parallel to the optical axis.

16. A beam homogenizer for laser radiation, comprising:
a first lens array, the first lens array having a plurality of identical lens elements, each lens element of the first lens array having a focal length $F_1$, neighboring lens elements of the first lens array being separated by a gap, the gap having no optical power, each gap having a common width;
a second lens array, the second lens array having a plurality of identical lens elements, each lens element of the second lens array having a focal length $F_2$, the first lens array and the second lens array being separated by a distance $F_2 \pm \delta$, $\delta$ being a distance that is less than 20% of $F_2$; and
a positive lens having a focal length $F_3$, the laser radiation propagating through the lens elements and the gaps of the first lens array, through the second lens array, through the positive lens, and onto an illumination plane in that order, the illumination plane located a distance $F_3$ from the positive lens;
wherein laser radiation propagating through the lens elements of the first lens array has a different magnification in the illumination plane than laser radiation propagating through the gaps of the first lens array;
wherein $F_1$, $F_2$, $F_3$, and $\delta$ are selected such that a ray incident on a lens element of the first lens array at a distance $X_1$ from a center of the lens element is projected onto the illumination plane at a distance $X_2$ from the optical axis of $e\delta/F_1$.

17. The beam homogenizer of claim 16, wherein the first lens array and the second lens array are separated by a distance $F_2+\delta$ that is more than $F_2$.

18. The beam homogenizer of claim 16, wherein the first lens array and the second lens array are separated by a distance $F_2-\delta$ that is less than $F_2$.

19. A beam homogenizer for laser radiation, comprising:
a first lens array, the first lens array having a plurality of identical lens elements, neighboring lens elements of the first lens array being separated by a gap, the gap having no optical power, each gap having a common width;
a second lens array, the second lens array having a plurality of identical lens elements, each lens element of the second lens array having a focal length $F_2$, the first lens array and the second lens array being separated by a distance not equal to $F_2$; and
a positive lens having a focal length $F_3$, the laser radiation propagating through the lens elements and gaps of the first lens array, through the second lens array, through the positive lens, and onto an illumination plane in that order, the illumination plane located a distance $F_3$ from the positive lens, the laser radiation on the illumination plane transformed into a homogenized intensity distribution having brighter or darker edges in an otherwise uniform intensity distribution.

* * * * *